United States Patent [19]

Urich

[11] Patent Number: 5,816,708
[45] Date of Patent: Oct. 6, 1998

[54] MECHANICAL-ELECTRICAL COMBINATION THERMOMETER

[76] Inventor: Manfred Urich, Anton-Bruckner-Strasse 3, D-61250 Usingen, Germany

[21] Appl. No.: 805,358

[22] Filed: Feb. 24, 1997

[30] Foreign Application Priority Data

Mar. 9, 1996 [DE] Germany ............... 196 09 203.5

[51] Int. Cl.$^6$ .................................................. G01K 5/36
[52] U.S. Cl. ........................ 374/203; 374/143; 374/188
[58] Field of Search .................................. 374/142, 143, 374/187, 188, 195, 201, 203, 208

[56] References Cited

U.S. PATENT DOCUMENTS

| | | | |
|---|---|---|---|
| 3,191,438 | 6/1965 | Myers | 374/203 |
| 3,403,558 | 10/1968 | Elliott | 374/188 |
| 3,410,141 | 11/1968 | Zurstadt | 374/203 |
| 3,875,800 | 4/1975 | Stockton | 374/203 |
| 4,279,155 | 7/1981 | Balkanli | 374/203 |
| 4,566,807 | 1/1986 | Koolen | 374/203 |
| 4,663,608 | 5/1987 | Kelly | 374/146 |
| 4,893,945 | 1/1990 | Okano et al. | 374/188 |

*Primary Examiner*—G. Bradley Bennett
*Attorney, Agent, or Firm*—Nikaido, Marmelstein, Murray & Oram LLP

[57] ABSTRACT

In the thermometer of the present invention a hollow sensing element (9) is connected by a capillary tube (18) to the hollow space of a Bourdon spring (19). The hollow sensing element (9), the capillary tube (18) and the mechanical measuring unit are filled with a substance whose pressure varies with temperature thus causing the Bourdon spring (19) to actuate a mechanical indicating device (5, 6). The capillary tube (18) or the hollow space of the mechanical measuring unit (2) has connected thereto an electric measuring unit (3) which comprises a measuring chamber (15) enclosed by a rigid casing (12), an electric pressure measuring cell (16) bounding the measuring chamber (16), and an electric measuring transducer (4) connected to the pressure measuring cell (16) for generating a transmittable signal.

8 Claims, 2 Drawing Sheets

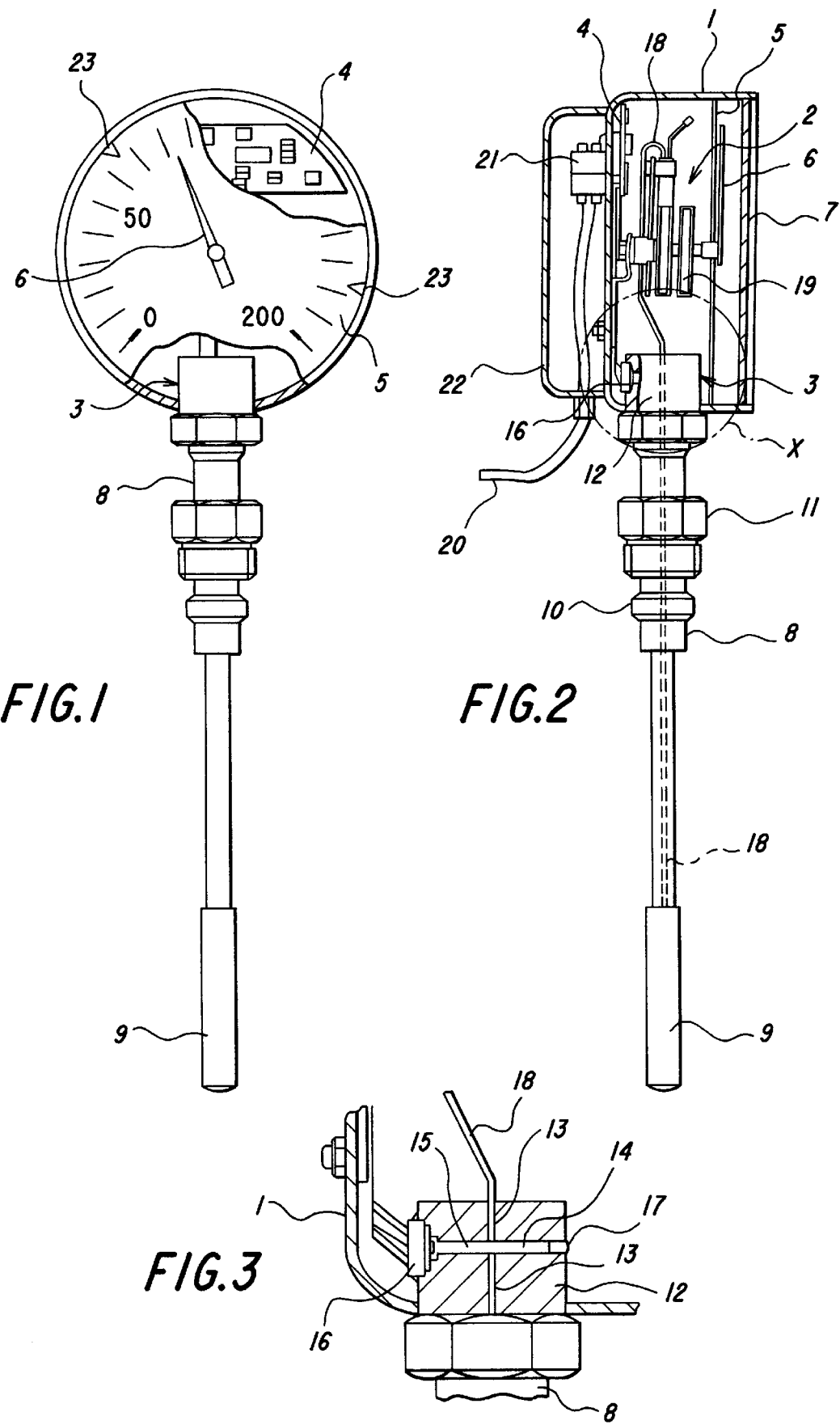

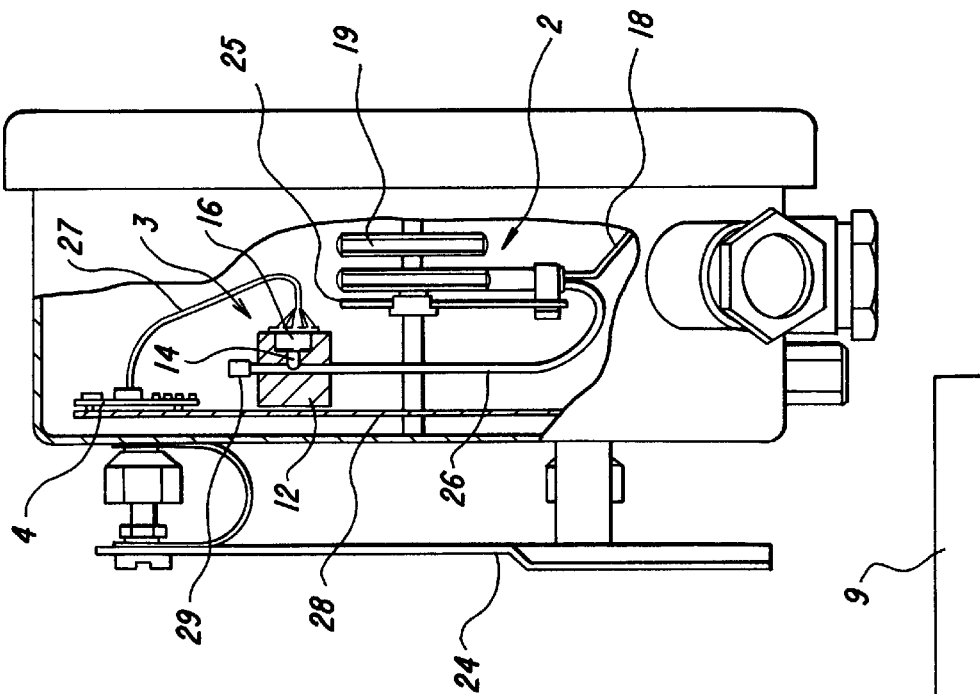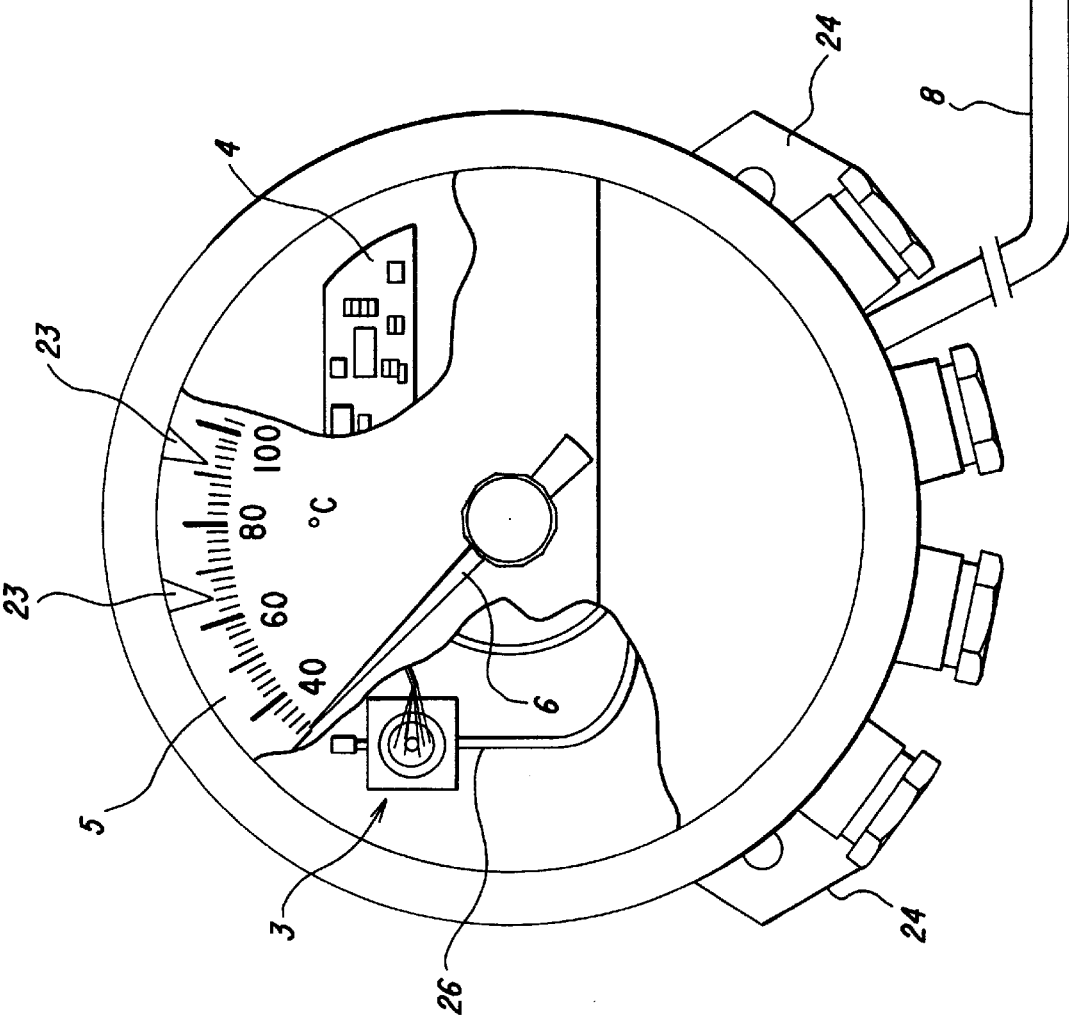

MECHANICAL-ELECTRICAL COMBINATION THERMOMETER

BACKGROUND OF THE INVENTION

This invention relates to a thermometer with a hollow sensing element whose hollow space is connected by a capillary tube to the hollow space of a mechanical measuring unit, particularly a Bourdon spring, in which the sensing element, the capillary tube and the mechanical measuring unit are filled with a substance whose pressure varies with temperature, and in which the mechanical measuring unit actuates a mechanical indicating device and/or switch.

Thermometers of the type referred to are known in the art, being widely referred to as spring-type thermometers. Depending on the type of thermometric substance used to fill these thermometers, a distinction is drawn between spring-type liquid thermometers, spring-type steam-pressure thermometers and spring-type gas thermometers. The rugged mechanical design of such thermometers guarantees a high degree of reliability and an exceptionally long useful life. These thermometers are used, therefore, in power stations, substations and comparable facilities where high demands are imposed on reliability and endurance. It is considered to be a disadvantage of these thermometers that remote transmission of the measured temperatures to a control center, for example, is not possible. Overstepping of predetermined limit values is detected with the help of limit switches and so can also be transmitted electrically to a control center, but that is all. A device for the remote transmission of other temperature measurements which differ from the limit values is not provided.

From DE 90 11 257 U1 there is known a gas thermometer with a measuring unit that has a gas chamber and a measuring element with a diaphragm forming a boundary for the gas chamber. Attached to the rear side of the diaphragm facing away from the gas chamber is a thin-film arrangement having strain gauges connected to form a measuring bridge and corresponding contact faces for connecting a supply and evaluation circuit. The deflection of the diaphragm induced by the pressure in the gas chamber is transmitted to the strain gauges, producing a change in the electrical resistance of the strain gauges which acts as a measuring signal for the temperature at the sensing element.

SUMMARY OF THE INVENTION

It is therefore an object of the present invention to further develop a thermometer of the type initially referred to so that, in addition to the local temperature indication, a measuring signal is available that is indicative of the respective temperature measurement and is suitable for remote transmission.

According to the present invention, this object is accomplished by additionally connecting to the capillary tube an electric measuring unit which includes a measuring chamber enclosed by a rigid casing, an electric pressure measuring cell bounding the measuring chamber, and an electric measuring transducer connected to the pressure measuring cell for generating a transmittable signal.

The invention is based on the realization that a temperature-responsive electrical signal suitable for remote transmission is obtainable by particularly simple and reliable means and without impairment of the existing measuring system's accuracy of measurement with the help of a second measuring unit with pressure measuring cell connected to the capillary tube, because an additional measuring unit of this type requires only a negligible amount of additional dead space, causing practically no pressure-dependent volumetric changes. It is also an advantage that a second measuring unit of this type can be installed without difficulty in existing thermometer models because it needs only to be connected to the capillary tube while the existing mechanical measuring unit with its indicating device and limit switches can be retained completely unchanged in its service-proven configuration. A further advantage of installing an additional electric measuring unit for direct detection of the temperature-dependent pressure is that it produces a second temperature measurement that is independent of the mechanical measuring unit, enabling reciprocal checking of the two measuring units and resulting in a higher level of operational reliability.

According to a further proposal of the present invention, the casing of the electric measuring unit can be provided with a through-bore that penetrates the measuring chamber and through which the capillary tube is passed, with the capillary tube having in the interior of the measuring chamber an opening and being fixed pressure-tight by soldering, welding or adhesive bonding in the two sections of the through-bore at either end of the measuring chamber. With simple means this further feature of the invention enables the measuring chamber to be connected to the capillary tube in the area between the sensing element and the mechanical measuring unit. The existing conventional configuration of the connections at the ends of the capillary tube may be therefore maintained. Making the connections is easy and requires no additional components. Provision can also be made for the measuring chamber to be formed by a casing bore that intersects or cuts the through-bore and has one end thereof closed by the pressure measuring cell. If the casing bore is drilled after the capillary tube is inserted in the through-bore, the opening in the capillary tube can thus be made simultaneously. It is also possible for the capillary tube to be inserted after the casing bore is manufactured and for the opening in the capillary tube to be made in a subsequent operation using a cutting tool inserted into the casing bore. According to a further proposal of this invention, the casing of the measuring chamber can be part of a supporting structure to which the sensing element is fastened and that serves as a holder for the thermometer at the place of measurement.

According to the present invention, the pressure measuring cell may have a metallic carrier that can be connected by welding or soldering to the casing, likewise made of metal, in order to produce a permanent pressure-tight mounting for the pressure measuring cell. According to the invention, the pressure measuring cell may include a piezoresistive measuring element or a measuring element with a measuring bridge made of strain gauges. If a piezoresistive measuring element is used, it can be acted upon directly by the substance whose pressure varies with temperature. Hence small pressure variations in the millibar range can be detected very precisely and quickly, practically requiring no volumetric changes in order to obtain a good measuring signal. By comparison, a measuring element based on thin-film technology with a measuring bridge made of strain gauges requires a relatively high pressure variation in the bar range in order to produce an adequate measuring signal. A measuring element of this type is suitable, therefore, only for less demanding requirements.

BRIEF DESCRIPTION OF THE DRAWING

Embodiments of the present invention will described in greater detail in the following with reference to the accompanying drawings.

In the draws,

FIG. 1 is a front view of a thermometer constructed in accordance with the present invention;

FIG. 2 is a side view, partly in section, of the thermometer of FIG. 1;

FIG. 3 is an enlarged sectional view of detail X of FIG. 2;

FIG. 4 is a front view of a further embodiment of a thermometer constructed in accordance with the present invention; and FIG. 5 is a side view, partly in section, of a thermometer of FIG. 4.

DESCRIPTION OF THE PREFERRED EMBODIMENTS

The thermometer shown in FIGS. 1 to 3 is comprised of a pot-shaped housing 1 formed of sheet metal that contains a mechanical measuring unit 2, an electric measuring unit 3, an electric measuring transducer 4, a dial 5 and a pointer 6 and which is closed by a glass window 7. The housing 1 is fastened to a rigid or flexible tubular supporting structure 8 carrying a hollow, liquid-filled sensing element 9 at its end remote from the housing 1. A sealing bead 10 formed on the supporting structure 8 and a union screw 11 are used to fasten the thermometer in an appropriately designed mounting bore, for example in the cooling jacket of a transformer whose temperature is to be measured and monitored.

The measuring unit 3 has a metallic casing 12, which as an extension of the supporting structure 8 is arranged inside the housing 1 and is connected with the supporting structure 8. The casing 12 is provided with a through-bore 13 in coaxial arrangement to the longitudinal axis of the supporting structure 8 and with a casing bore 14 intersecting the through-bore 13 at right angles and forming a measuring chamber 15. The casing bore 14 has its one end closed by a pressure measuring cell 16 which is joined tightly to the casing 12 by soldering or welding. Received in the other end of the casing bore 14 is a plug 17, or the end is welded or soldered shut. In the through-bore 13 is a capillary tube 18 which connects the hollow space of the sensing element 9 with the hollow space of a Bourdon spring 19 of the measuring unit 2. The capillary tube 18 is fully soldered in the through-bore 13 and is interrupted inside the casing bore 14 so that the casing bore 14 is connected by the capillary tube 18 to the hollow space of the sensing element 9 on the one hand and to the hollow space of the Bourdon spring 19 on the other hand.

Electric connecting leads extend from the pressure measuring cell 16 to the measuring transducer 4. The connection between the measuring transducer 4 and a connecting lead 20 for feeding a supply voltage and for transmitting the measuring signal is made via a terminal block 21 arranged on the rear side of the housing 1 under a cap 22. The terminal block 21 also has terminals for the mechanical limit switches 23 illustrated schematically in FIG. 1, which can be actuated by the mechanical measuring unit 2.

The pressure measuring cell 16 of the measuring unit 3 may contain a pressure-sensitive silicon sensor having four resistors that are wired to form a measuring bridge and whose resistance value changes linearly with the pressure in the measuring chamber 15 as a result of piezoresistive action. The resistance bridge is fed with a constant current, thus emitting a voltage signal that is proportional to the pressure in the measuring chamber. Zero balancing takes place via a compensation resistor. Instead of a piezoresistive sensor it is also possible to use a sensor diaphragm based on thin-film technology with a measuring bridge made of strain gauges.

FIGS. 4 and 5 illustrate an embodiment of a thermometer having many features in common with the thermometer shown in FIGS. 1 to 3. Hence the same reference numerals are used in the following for the corresponding components.

The housing 1 of the thermometer of FIGS. 4 and 5 contains the mechanical measuring unit 2, the electric measuring unit 3, the measuring transducer 4, the dial 5 and the pointer 6 and is equipped on its rear side with a mounting bracket 24. The thermometer has a sensing element 9 which is attached to the end of a flexible, tubular supporting structure 8. The capillary tube 18 is also flexible, extending without interruption from the sensing element 9 through the supporting structure 8 to the connection point of the Bourdon spring 19 held on a plate 25 formed fast with the housing. A capillary filler tube 26 which establishes the connection to the electric measuring unit 3 branches off the connection point of the Bourdon spring 19. The end of the filler tube 26 extends through a through-bore in the casing 12 of the measuring unit 3 and is fastened pressure-tight in the through-bore by soldering or welding. Inside the through-bore the filler tube 26 is interrupted or provided with an opening, thereby establishing a connection to the casing bore 14, which branches off the through-bore at right angles and whose end is closed by the pressure measuring cell 16. The pressure measuring cell 16 is connected to the measuring transducer 4 by an electric connecting lead 27. The casing 12 and the measuring transducer 4 are fastened to a common plate 28 in the interior of the housing 1. After filling in the preferably liquid substance for generating a variation of pressure with temperature, the free end 29 of the filler tube 26 projecting from the casing 12 is tightly sealed by welding or soldering.

The connection of the electric measuring unit via the filler tube as provided in this embodiment is an advantage because the person in the art is less restricted in the spatial arrangement of the electric measuring unit in the interior of the instrument housing. Furthermore, it is thus also possible by simple means to retrofit existing thermometers with an additional electric measuring unit.

The mechanical-electrical combination thermometers hereinabove described are easy and economical to manufacture and can be used not only for the local indication of temperature but also for the remote transmission of temperature measurements. If remote transmission is not desired, in place of the pressure measuring cell the measuring chamber can be closed with a plug to cut costs. There is no need to change the other components.

What is claimed is:

1. A thermometer with a hollow sensing element whose hollow space is connected by a capillary tube to the hollow space of a mechanical measuring unit, particularly a Bourdon spring, in which the sensing element, the capillary tube and the mechanical measuring unit are filled with a substance whose pressure varies with temperature, and in which the mechanical measuring unit actuates a mechanical indicating device and/or switch, wherein the capillary tube or the hollow space of the mechanical measuring unit has additionally connected thereto an electric measuring unit which includes a measuring chamber enclosed by a rigid casing, an electric pressure measuring cell bounding the measuring chamber, and an electric measuring transducer connected to the pressure measuring cell for generating a transmittable signal.

2. A thermometer as claimed in claim 1, wherein the casing of the electric measuring unit is provided with a through-bore that penetrates the measuring chamber and through which the capillary tube or a filler tube connected to the hollow space of the mechanical measuring unit is passed, and wherein the capillary tube or the filler tube has in the interior of the measuring chamber an opening or interruption and is fixed pressure-tight by soldering, welding or adhesive bonding in the two sections of the through-bore at either end of the measuring chamber.

3. A thermometer as claimed in claim 2, wherein the measuring chamber is formed by a casing bore that intersects or cuts the through-bore and has one end thereof closed by the pressure measuring cell.

4. A thermometer as claimed in claim 3, wherein the casing bore is manufactured after the capillary tube or the filler tube is inserted in the through-bore.

5. A thermometer as claimed in claim 1, wherein the casing of the measuring chamber is part of a supporting structure to which the sensing element is fastened.

6. A thermometer as claimed in claim 1, wherein the pressure measuring cell has a metallic carrier that is adapted to be connected by welding or soldering to the casing, likewise made of metal.

7. A thermometer as claimed in claim 1, wherein the pressure measuring cell includes a piezoresistive measuring element or a measuring element with a measuring bridge made of strain gauges.

8. A thermometer as claimed in claim 7, wherein the piezoresistive measuring element is acted upon directly by the substance whose pressure varies with temperature.

* * * * *